United States Patent
Fujihara et al.

(10) Patent No.: US 7,121,623 B2
(45) Date of Patent: Oct. 17, 2006

(54) VEHICULAR SEAT STRUCTURE

(75) Inventors: Kiyotaka Fujihara, Saitama (JP); Koichi Sugioka, Saitama (JP); Mamoru Otsubo, Saitama (JP); Eiji Ozawa, Saitama (JP); Toshikazu Saito, Saitama (JP); Yumio Shibata, Saitama (JP); Hiroshi Inokawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/947,315

(22) Filed: Sep. 23, 2004

(65) Prior Publication Data

US 2005/0116517 A1 Jun. 2, 2005

(30) Foreign Application Priority Data

Sep. 30, 2003 (JP) ............................. 2003-339339

(51) Int. Cl.
*A47C 15/00* (2006.01)
(52) U.S. Cl. ................ 297/243; 297/232; 297/452.21; 297/452.22; 297/452.25; 280/DIG. 5
(58) Field of Classification Search ................ 297/243, 297/232, 452.33, 452.34, 452.28, 452.29, 297/452.21, 452.22, 452.23, 452.25, 452.32, 297/452.35; 280/DIG. 5
See application file for complete search history.

(56) References Cited

U.S. PATENT DOCUMENTS

| | | | | |
|---|---|---|---|---|
| 2,766,815 A * | 10/1956 | Brooks et al. ............... 297/232 |
| 2,825,393 A * | 3/1958 | Warburton et al. . 297/452.22 X |
| 3,632,157 A * | 1/1972 | Lohr ....................... 297/232 X |
| 3,776,353 A * | 12/1973 | Roth ....................... 297/243 X |
| 3,890,004 A * | 6/1975 | Rail ................... 297/452.21 X |
| 4,607,882 A * | 8/1986 | Opsvik .............. 297/452.25 X |
| 5,018,790 A * | 5/1991 | Jay .................... 297/452.25 X |
| 5,395,162 A * | 3/1995 | Jay et al. ............... 297/452.25 |
| 5,522,106 A * | 6/1996 | Harrison et al. ..... 297/452.25 X |
| 5,613,257 A * | 3/1997 | Graebe .............. 297/452.25 X |
| 6,293,610 B1 * | 9/2001 | Howard ................. 280/DIG. 5 |
| 6,293,616 B1 * | 9/2001 | Williams et al. ....... 280/DIG. 5 |
| 2003/0102694 A1 | 6/2003 | Rondeau et al. |
| 2003/0127891 A1 | 7/2003 | Wiedeman et al. ......... 297/232 |

FOREIGN PATENT DOCUMENTS

| | | |
|---|---|---|
| DE | 19508675 A1 | 1/1996 |
| DE | 29518853 U | 2/1997 |
| JP | 3-67287 U | 7/1991 |

* cited by examiner

*Primary Examiner*—Rodney B White
(74) *Attorney, Agent, or Firm*—Birch, Stewart, Kolasch & Birch, LLP

(57) ABSTRACT

A vehicle is provided which enables rear occupants to sit on a rear seat in a vehicle provided with seats arranged in a substantially longitudinal direction while simultaneously securing the comfort and safety of the rear occupants in a relatively small vehicle. The seat structure of the vehicle includes a wide rear seat provided with right and left seated parts for rear occupants M2, M2 at a rear side of a front seat for a driver. A backrest corresponding to the right and left seated parts is provided on the rear seat that extends diagonally rearward from a center portion thereof toward sides of the vehicle body. Raised, convex portions for regulating the lateral movement of the occupants are provided between each seated part in the rear seat, at the center of the backrest and in the front seat.

19 Claims, 11 Drawing Sheets

VEHICULAR SEAT STRUCTURE

CROSS-REFERENCES TO RELATED APPLICATIONS

This nonprovisional application claims priority under 35 U.S.C. § 119(a) on Patent Application No. 2003-339339 filed in Japan on Sep. 30, 2003, the entirety of which is hereby incorporated by reference.

BACKGROUND OF THE INVENTION

1. Field of the Invention

The present invention relates to a technique for the improvement of a vehicle provided with seats arranged in a generally longitudinal direction.

2. Description of the Background Art

A vehicle of the background art is provided with a rear seat for rear occupants who are positioned sitting behind a front seat of a driver's seat. This seating arrangement is further described in Japanese Patent Document No. JP-A-3-67287, the entirety of which is hereby incorporated by reference. In this type of vehicle seating arrangement, a scooter-type double motorcycle or a scooter-type three-wheeled vehicle is provided in which a rider that steers a handlebar sits in a front seat and a rear occupant(s) sit in a rear seat(s).

In these types of seating arrangements, the present inventors have determined that it is desirable in a vehicle such as a motorcycle or a three-wheeled vehicle to provide for a maximum number of occupants without substantially increasing the size of the required seating area and the vehicle itself. Therefore, it will be desirable to enable the seating of more than one rear occupants on a single rear seat while simultaneously ensuring the safety and comfort of the rear occupants.

SUMMARY OF THE INVENTION

The present invention overcomes the shortcomings associated with the background art and achieves other advantages not realized by the background art.

An object of the present invention is to enable comfortable and economical seating of more than one rear occupant on a rear seat of a vehicle provided with seats arranged generally in a longitudinal direction.

An object of the present invention is to enable the seating of more than one rear occupant without increasing the size of the vehicle.

One or more of these and other objects are accomplished by a vehicular seat structure comprising a front seat positioned on vehicle body; a rear seat provided with right and left seat portions for rear occupants is positioned behind the front seat, the rear seat including a backrest having corresponding sections for the right and left seated parts, wherein the backrest is inclined diagonally rearward from a center portion of the rear seat toward side portions of the rear seat.

One or more of these and other objects are accomplished by a vehicle for seating a plurality of occupants, the vehicle comprising a vehicle body having at least one front wheel and at least one rear wheel; a front seat positioned on the vehicle body; a rear seat provided with right and left seat portions for rear occupants is positioned behind the front seat, the rear seat including a backrest having corresponding sections for the right and left seated parts, wherein the backrest is inclined diagonally rearward from a center portion of the rear seat toward side portions of the rear seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
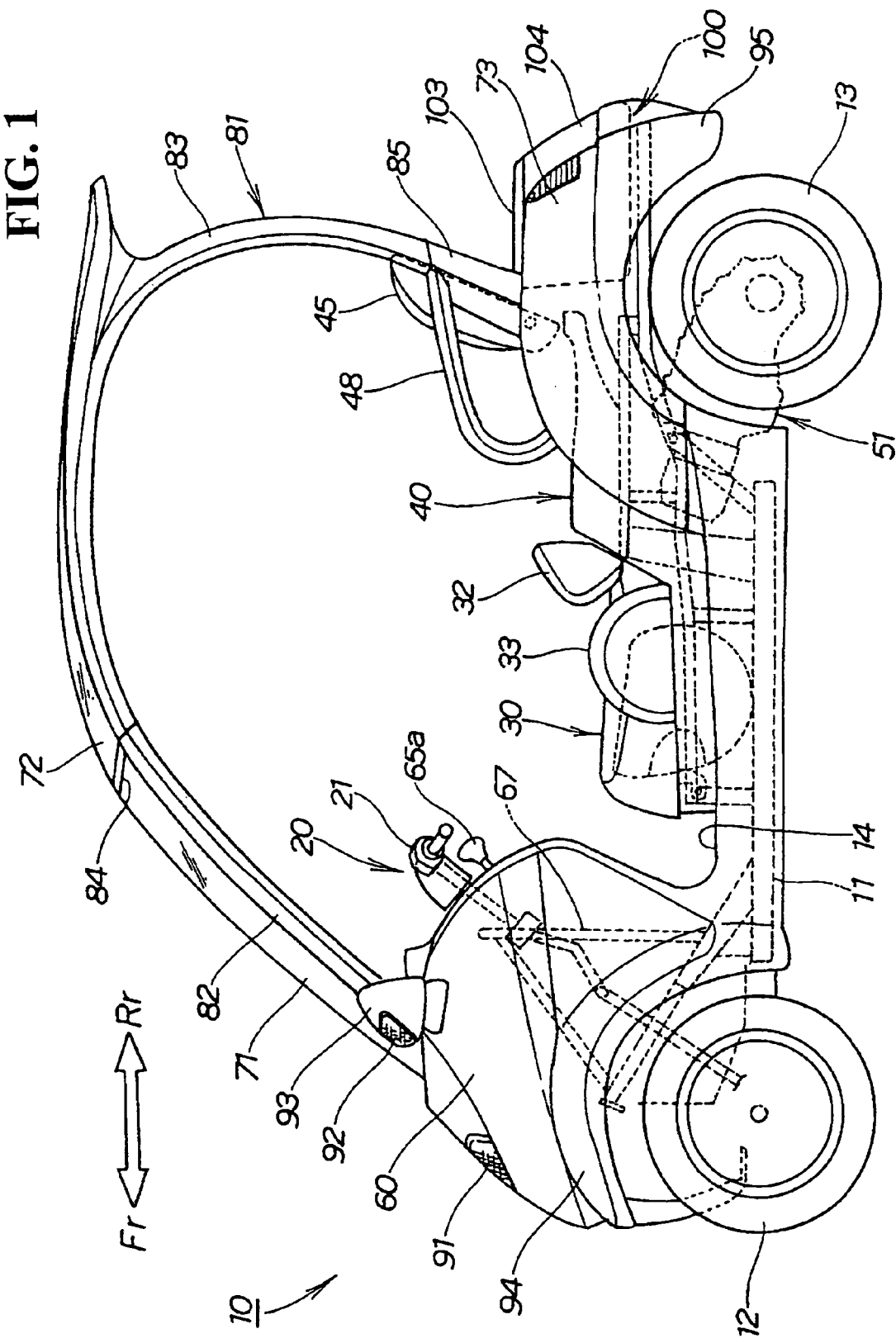
FIG. 1 is a left side view of a vehicle according to an embodiment of the present invention.
Figure 2:
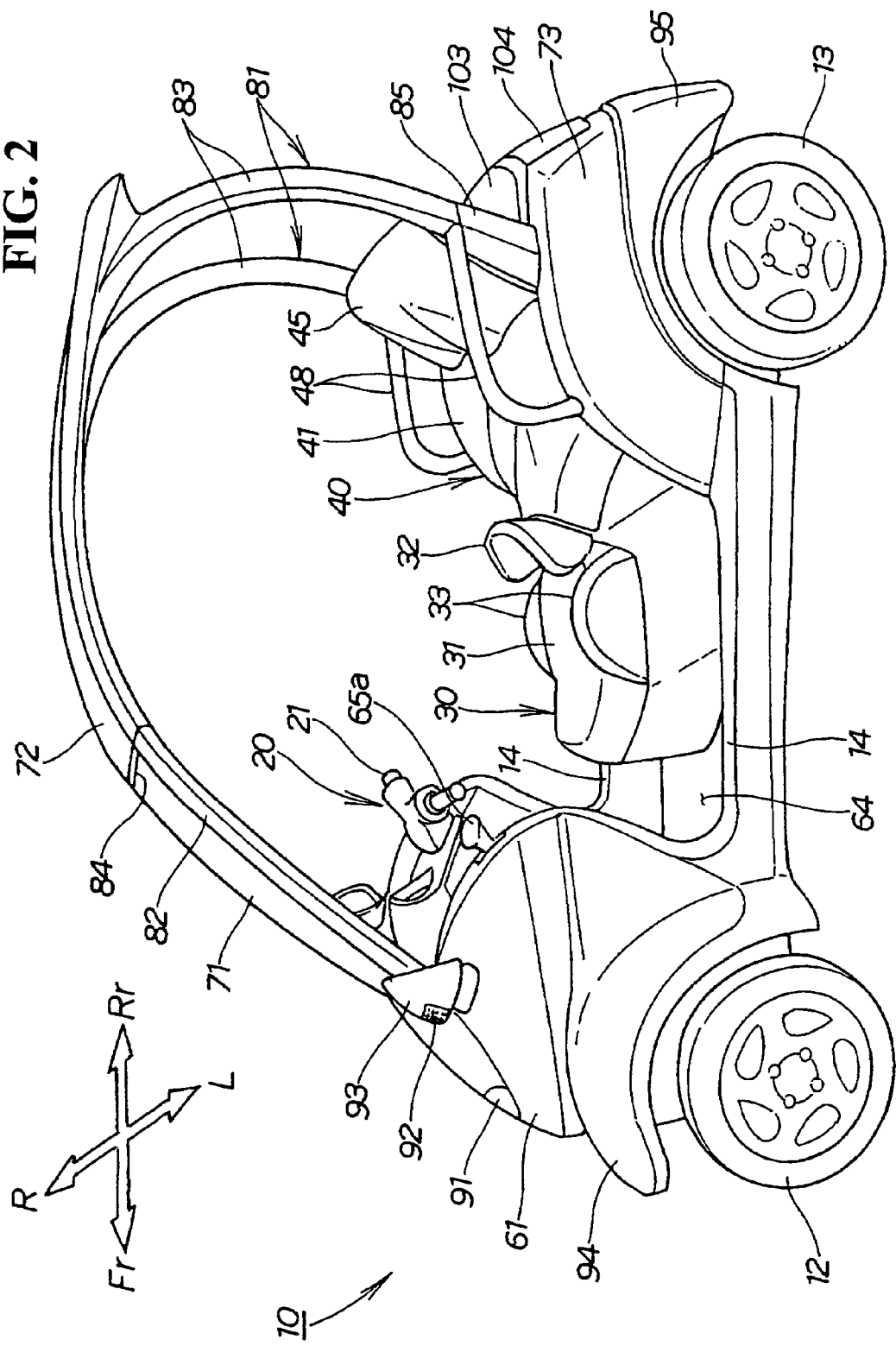
FIG. 2 is a perspective view of a vehicle according to an embodiment of the present invention as viewed from a left side of the vehicle.
Figure 3:
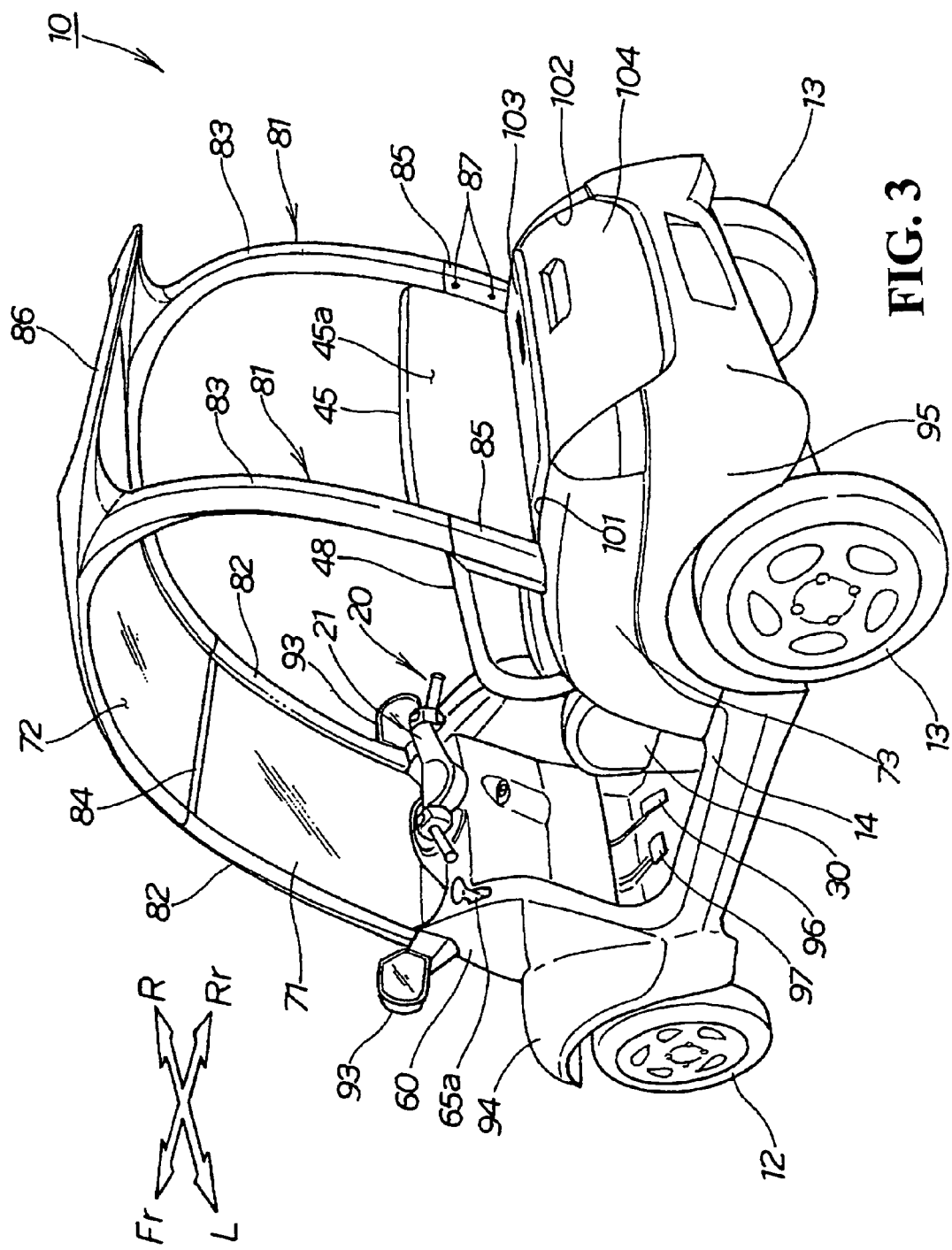
FIG. 3 is a perspective view of a vehicle according to an embodiment of the present invention as viewed from a left and rear side of the vehicle.
Figure 4:
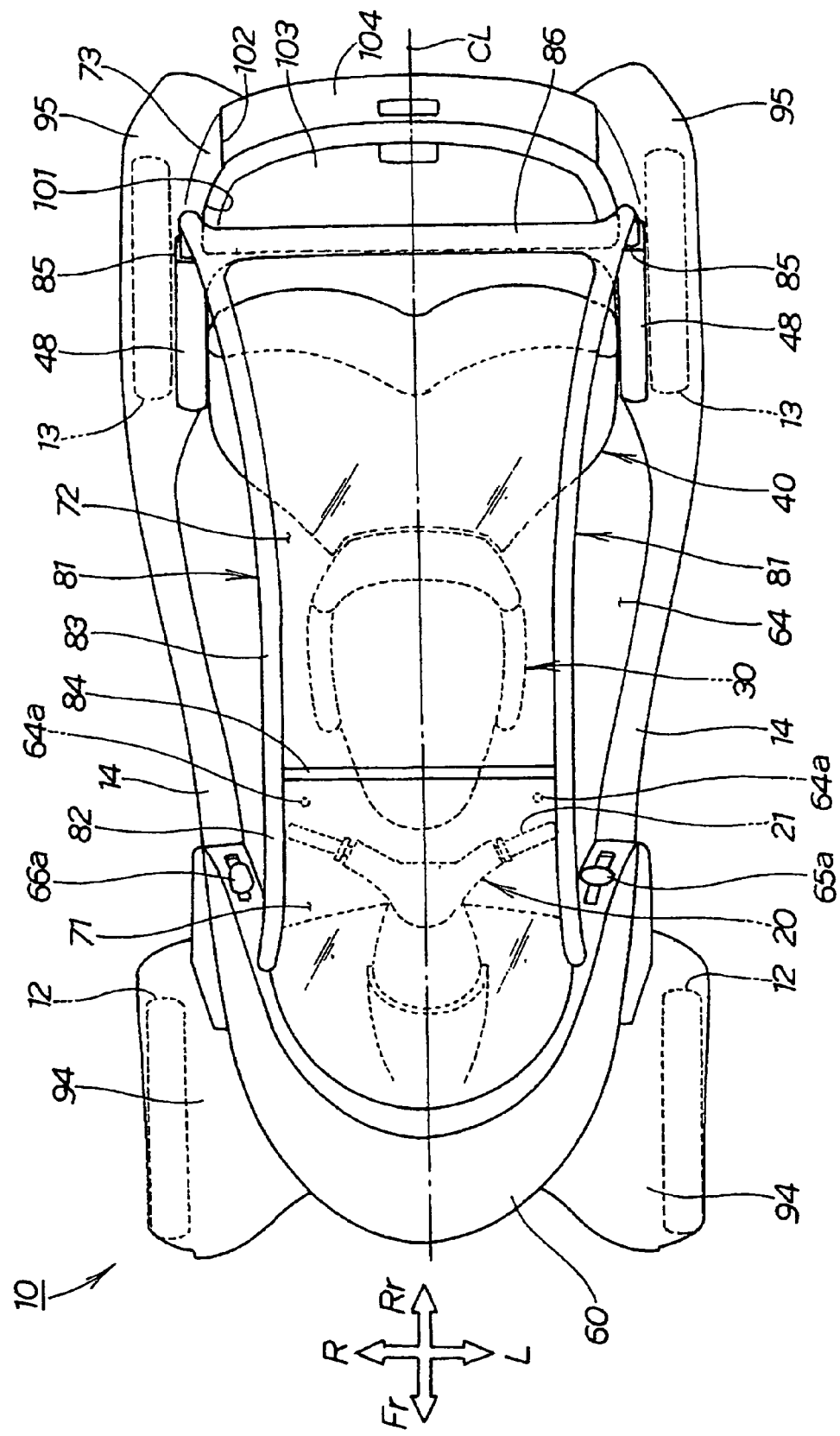
FIG. 4 is a plan view of a vehicle according to an embodiment of the present invention.
Figure 5:
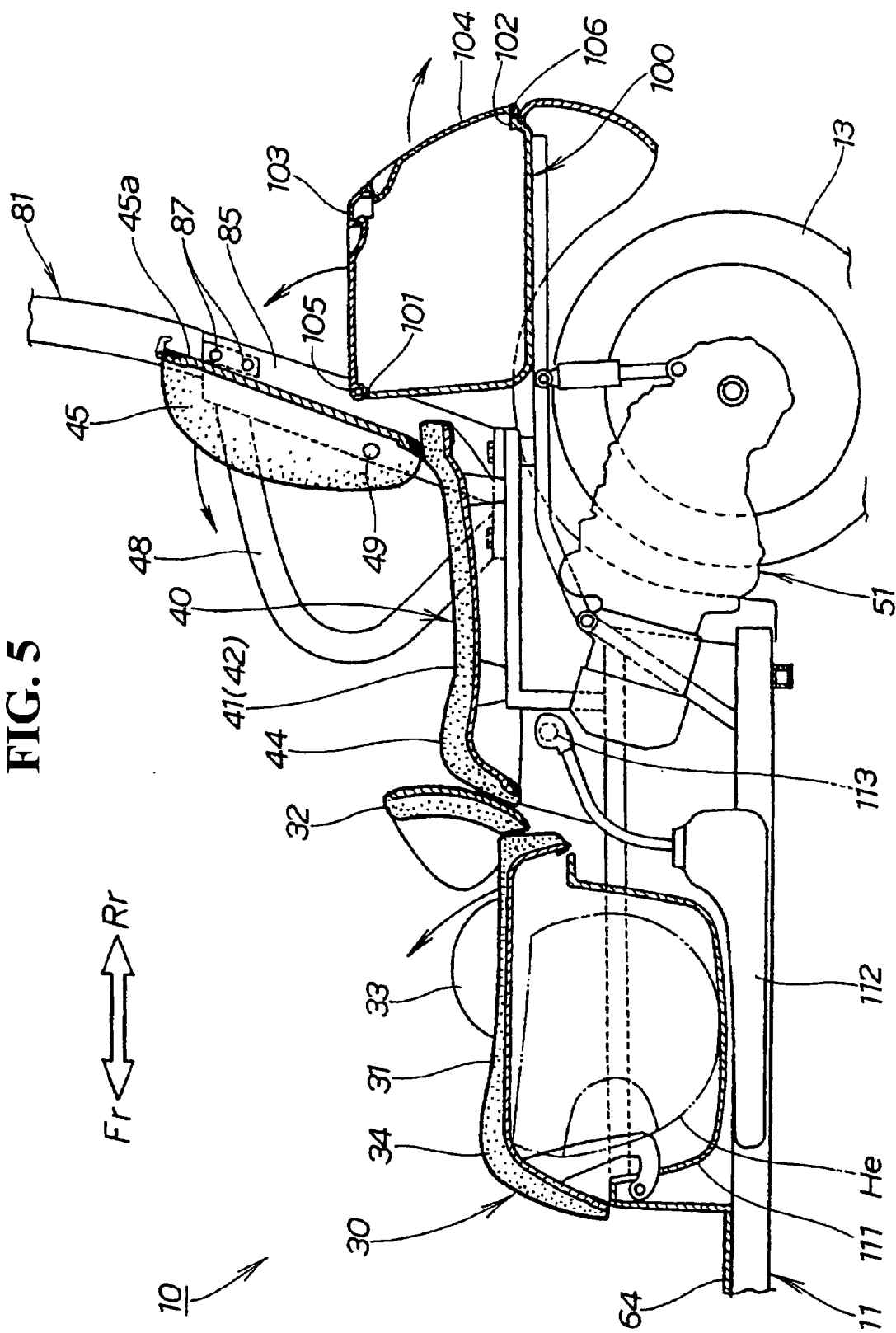
FIG. 5 is a left side, sectional view of a vehicle according to an embodiment of the present invention.
Figure 6:
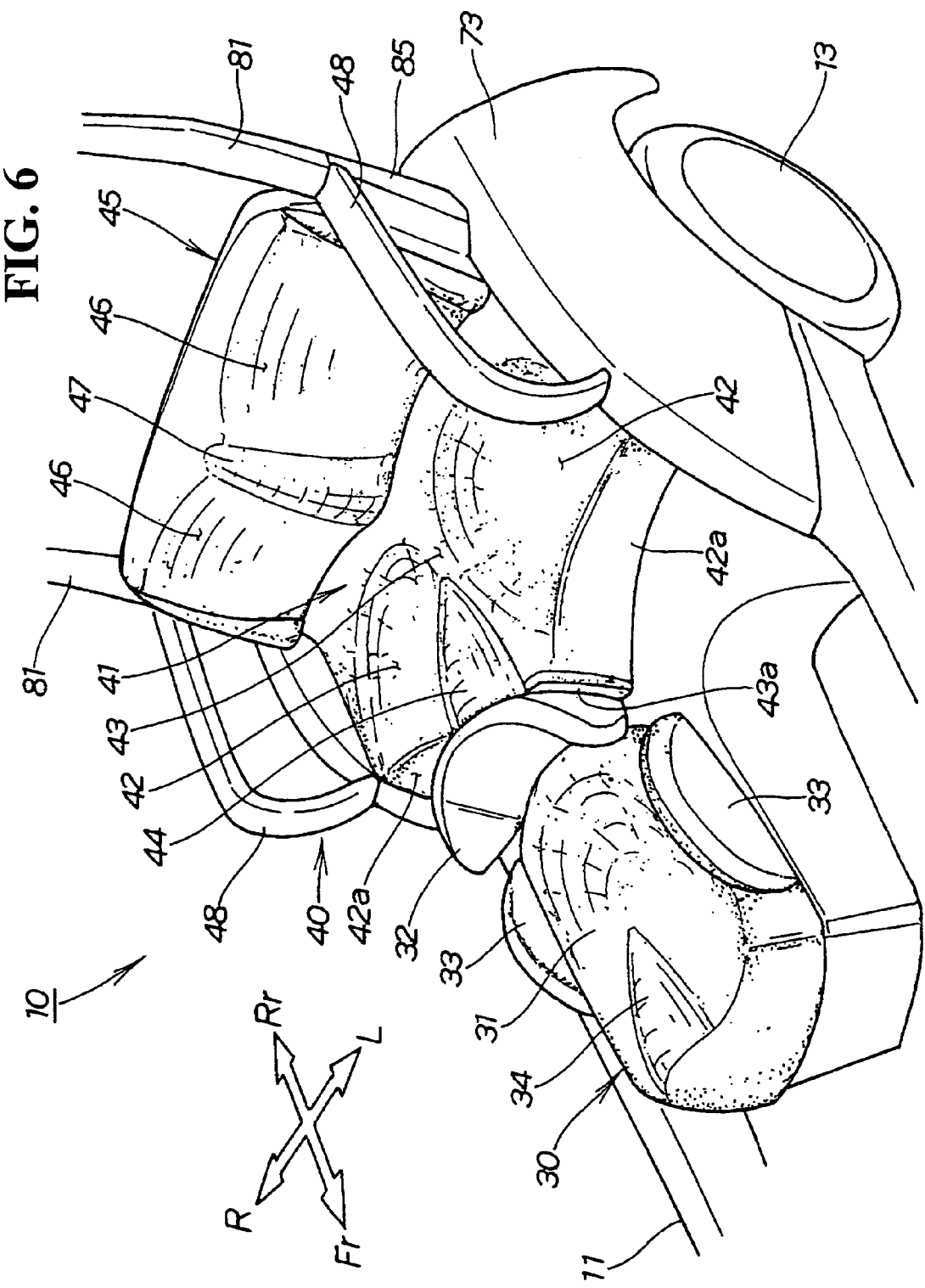
FIG. 6 is a perspective view of a vehicle according to an embodiment of the present invention showing front and rear seats and the perimeter of the vehicle.
Figure 7:
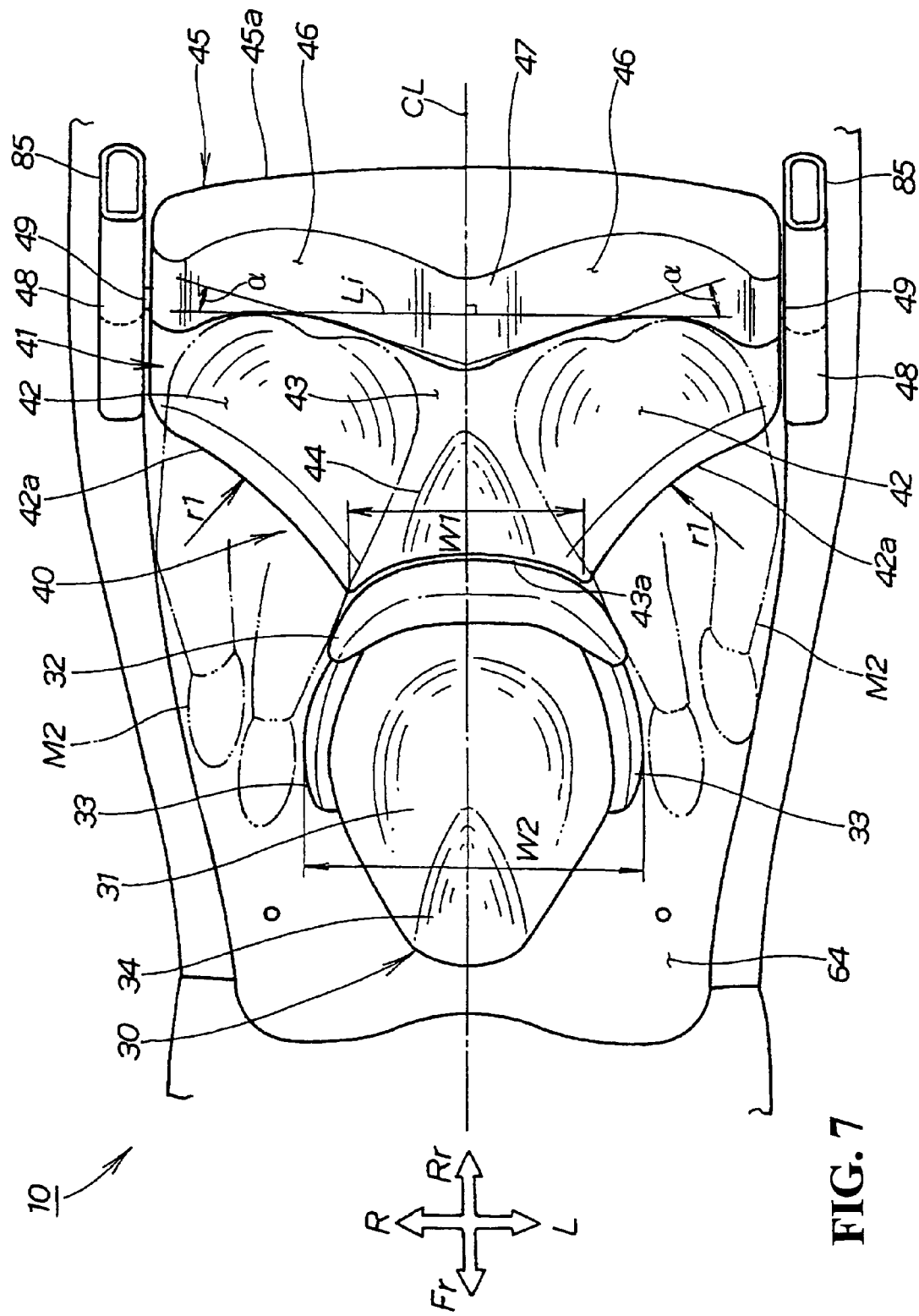
FIG. 7 is a plan view showing front and rear seats and the perimeter of a vehicle according to an embodiment of the present invention.
Figure 8:
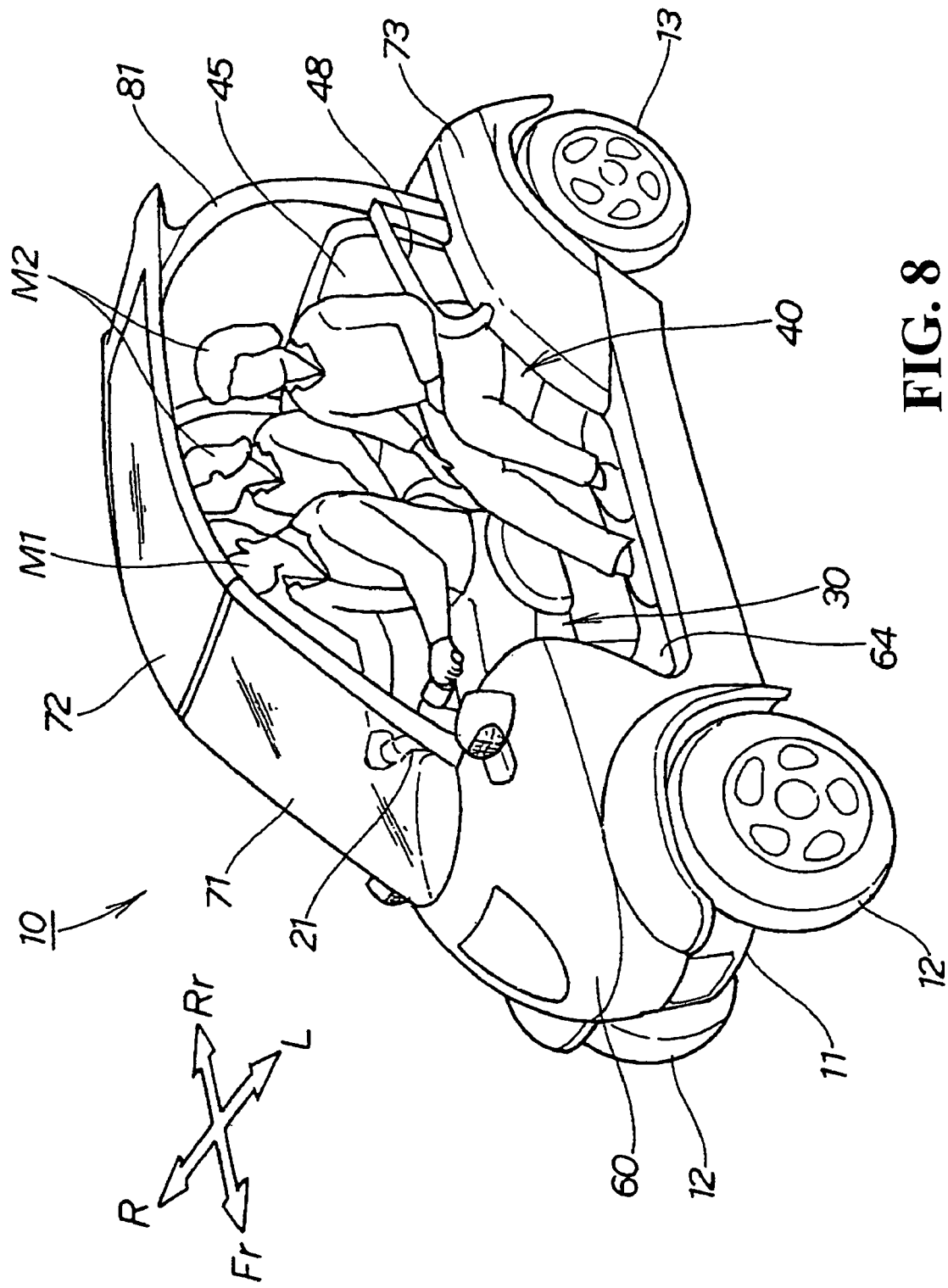
FIG. 8 is a perspective view showing the operation of the vehicle with passengers according to an embodiment of the present invention.
Figure 9:
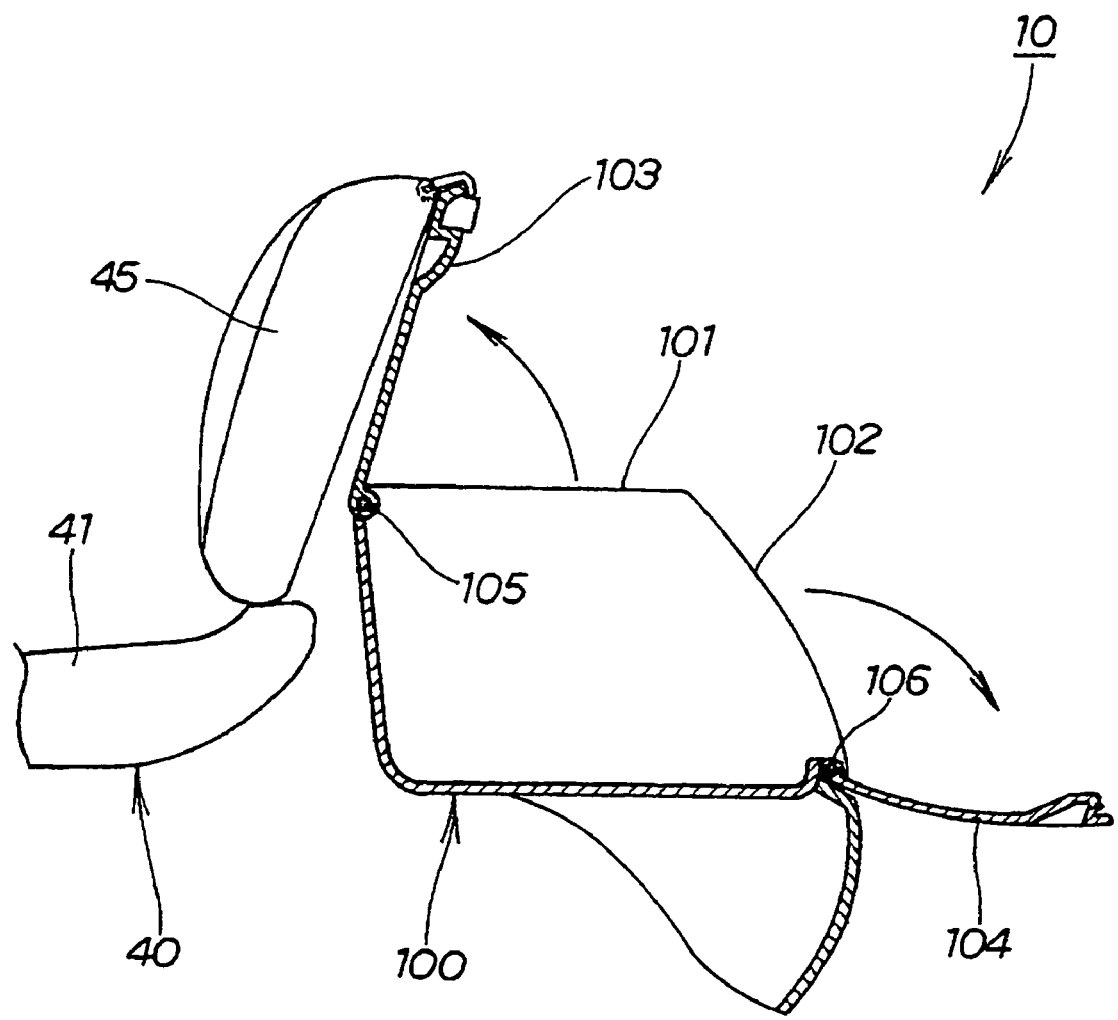
FIG. 9 is a sectional view of a rear trunk of a vehicle according to an embodiment of the present invention when viewed from a left side.
Figure 10:
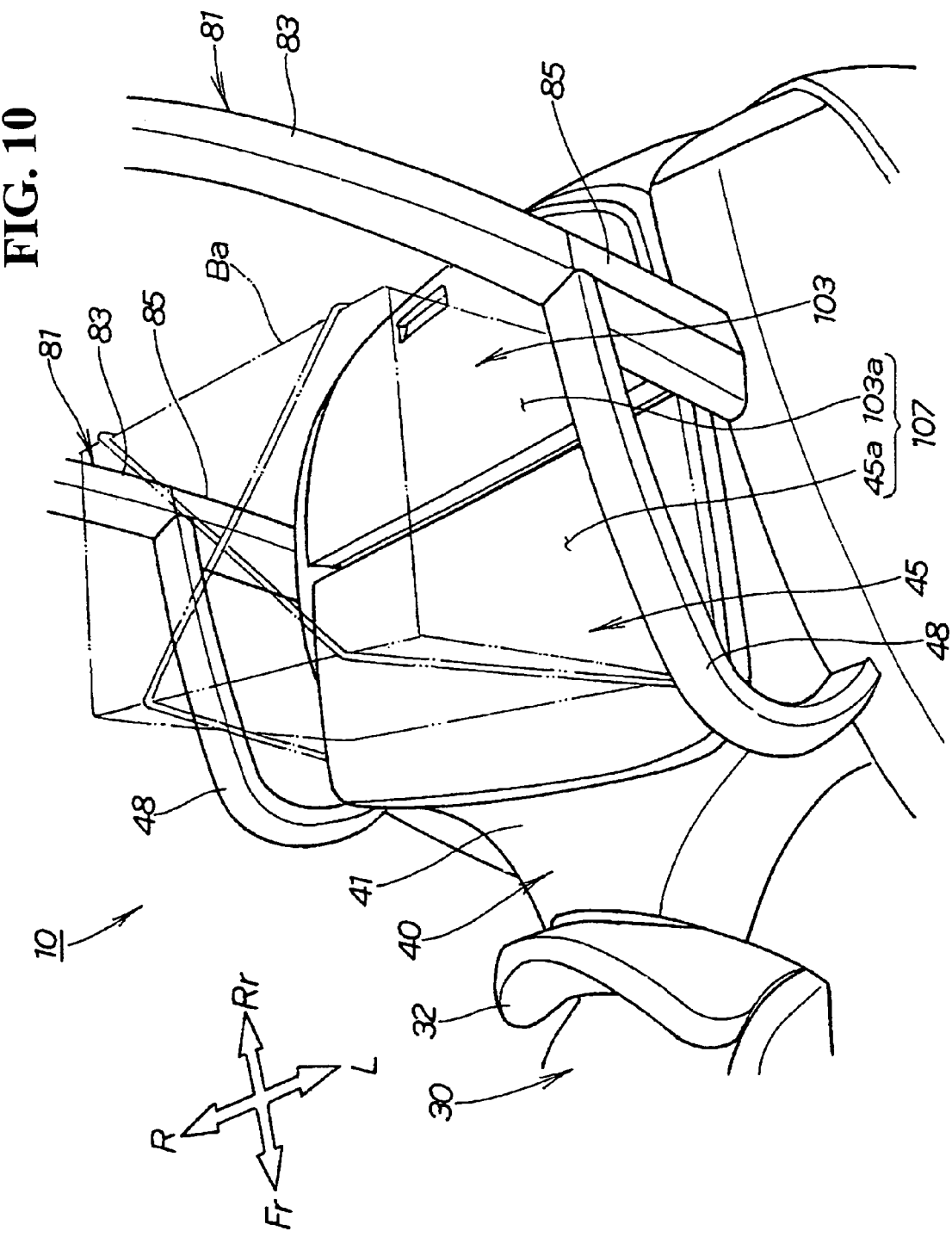
FIG. 10 shows a configuration and action of a backrest of a rear seat and a rear trunk of a vehicle according to an embodiment of the present invention.
Figure 11A:
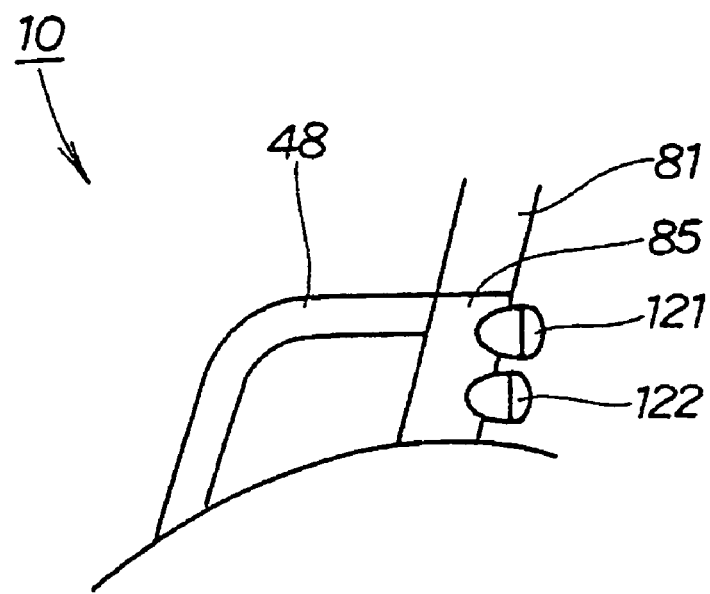
FIGS. 11($a$)–($b$) are side views of exemplary arm rest supporting members according to an embodiment of the present invention.
Figure 11B:
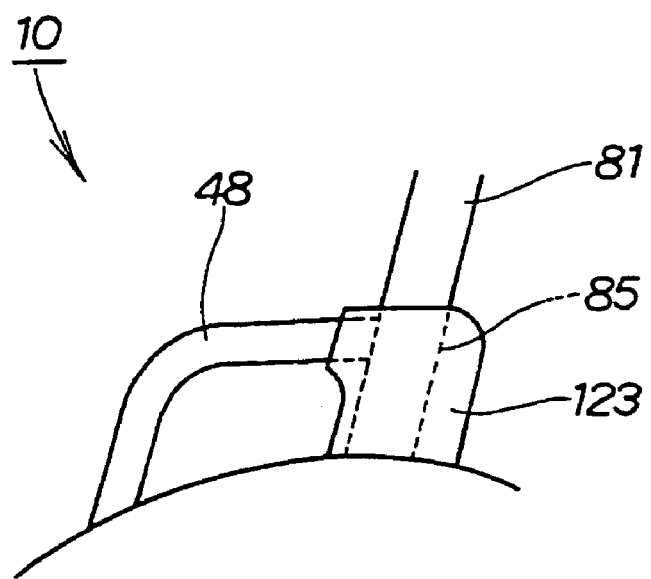

The present invention will hereinafter be described with reference to the accompanying drawings. FIG. 1 is a left side view of a vehicle according to an embodiment of the present invention. FIG. 2 is a perspective view of a vehicle according to an embodiment of the present invention as viewed from a left side of the vehicle. FIG. 3 is a perspective view of a vehicle according to an embodiment of the present invention as viewed from a left and rear side of the vehicle. FIG. 4 is a plan view of a vehicle according to an embodiment of the present invention. FIG. 5 is a left side, sectional view of a vehicle according to an embodiment of the present invention. FIG. 6 is a perspective view of a vehicle according to an embodiment of the present invention showing front and rear seats and the perimeter of the vehicle. FIG. 7 is a plan view showing front and rear seats and the perimeter of a vehicle according to an embodiment of the present invention. FIG. 8 is a perspective view showing the operation of the vehicle with passengers according to an embodiment of the present invention. FIG. 9 is a sectional view of a rear trunk of a vehicle according to an embodiment of the present invention when viewed from a left side. FIG. 10 shows a configuration and action of a backrest of a rear seat and a rear trunk of a vehicle according to an embodiment of the present invention. FIGS. 11(a)–(b) are side views of exemplary arm rest supporting members according to an embodiment of the present invention.

Referring to the attached drawings, a preferred embodiment of the invention will be described hereinafter. The terms "front," "rear," "left," "right," "upper," and "lower" are in relation to a direction viewed from a rider seated within a vehicle during a normal operating state. The legend "Fr" denotes the front side, "Rr" denotes the rear side, "L" denotes the left side, "R" denotes the right side, and "CL" denotes the center of the width of the body (the center of the body) of a vehicle. The drawings should be viewed in a direction that permits a proper reading of the reference numerals contained therein.

FIG. 1 is a left side view of a vehicle according to an embodiment of the present invention. FIG. 2 is a perspective view of a vehicle according to an embodiment of the present invention as viewed from a left side of the vehicle. FIG. 3 is a perspective view of a vehicle according to an embodiment of the present invention as viewed from a left and rear side of the vehicle. FIG. 4 is a plan view of a vehicle according to an embodiment of the present invention.

The vehicle 10 is a small-sized four-wheel vehicle provided with two right and left front wheels 12, 12 and two right and left rear wheels 13, 13 operatively connected to the body frame 11. The vehicle 10 is provided with a handlebar (21) type steering mechanism 20 in the front of the body 11, with a front seat 30 and a rear seat 40 in the center of the body 11, and a power unit 51 in a rear lower part of the body frame 11. The vehicle 10 is further provided with a front cover 60 that covers the circumference of the front of the body 11, a wind screen 71 attached to an upper side of the front cover 60, a roof 72 that is continuously extended rearward from the upper end of the wind screen 71 and which covers the upside of the front and rear seats 30, 40 and a rear cover 73 that covers the rear of the body frame 11.

The supporting structure of the roof 72 supports the roof 72 with right and left roof side pillars 81, 81 as shown in FIG. 3. The right and left roof side pillars 81, 81 are a roof pillar pipe arched from the front of the body to the rear of the body, which includes front pillars 82, 82 and rear pillars 83, 83 integrally combined either as separate pieces or as a single piece on each side of the vehicle 10.

The right and left front pillars 82, 82 are members that extend rearward and upward from the upper end of the front cover 60 in the front of the body. A front cross member 84 crosses the upper ends of the right and left front pillars 82, 82 to provide lateral support. The wind screen 71 is also provided between the right and left front pillars 82, 82.

The right and left rear pillars 83, 83 are members extending upward from the upper ends of right and left supporting members 85, 85 provided at the rear of the body, and which further extend forward from their upper ends. The front ends of the right and left rear pillars 83, 83 are attached to the rear ends of the front pillars 82, 82 by bolts so that the members can be detached. A rear cross member 86 crosses the rear upper ends of the rear pillars 83, 83. The right and left supporting members 85, 85 support the rear pillars 83, 83 by attaching the right and left rear pillars 83, 83 to the upper ends by bolts 87, (see FIG. 3) so that the right and left rear pillars can be easily detached and/or secured.

The roof 72 can be supported by attaching the substantially flat roof 72 to a frame composed of the right and left front pillars 82, 82, the right and left rear pillars 83, 83 and the front and rear cross members 84, 86 so that the roof can be detached easily and quickly. As for the right and left roof side pillars 81, 81, the front pillars 82, 82 and the rear pillars 83, 83 may be also integrally formed as separate or single pieces. In a preferred embodiment, only the front and the rear pillars may be a rigid pipe, the center may be also a member made of resin, and these members may be also combined into single pieces.

As shown in FIG. 4, the rear end of the roof 72 is located at the back of the rear seat 40. The width of the roof 72 is substantially the same as the width of the body or slightly smaller than it. The side of the vehicle 10 is open, and a rider and occupants can freely get on/off. As described above, the wind screen 71 covers a forward direction of the front seat 30 and the roof 72 can cover an upward direction of the front seat 30 and the rear seat 40. The windscreen and the roof can protect not only the rider, but the occupants in the rear from rain and others. Luggage put on the rear seat 40 can be also protected from rain and others. Further, as only the roof 72 is provided and the sides are open, the rider and the occupants can easily get on/off despite the presence of a roof 72.

As shown in FIGS. 3 and 4, the vehicle 10 is also provided with a protruding edge 14 or step area, a handlebar 21, a front cover 60, a gear shift lever 65a, a parking lever 66a (see FIG. 4), a headlamp 91, a blinker 92, a side mirror 93, a front fender 94, a rear fender 95, an accelerator pedal 96 (see FIG. 3), and a brake pedal 97 (see FIG. 3).

FIG. 5 is a left side, sectional view of a vehicle according to an embodiment of the present invention. FIG. 6 is a perspective view of a vehicle according to an embodiment of the present invention showing front and rear seats and the perimeter of the vehicle. FIG. 7 is a plan view showing front and rear seats and the perimeter of a vehicle according to an embodiment of the present invention. FIG. 8 is a perspective view showing the operation of the vehicle with passengers according to an embodiment of the present invention.

As shown in FIG. 5, in the vehicle 10, the rear seat 40 for occupants to sit is provided near to the rear of the front seat 30 for the rider to sit, the supporting members 85, 85 are provided at the back of the rear seat 40, a rear trunk 100 is provided at the back of a backrest for occupants 45 and the supporting members 85, 85, a front housing box 111 is provided under the front seat 30, and further, a fuel tank 112 is provided below the front housing box 111. A reference number 113 denotes an oil filler port.

The right and left supporting members 85, 85 are short struts attached to the rear of the body frame 11 so that the supporting members can be detached and also simultaneously function as an arm rest supporting member. Accordingly, the supporting members 85, 85 are hereinafter referred to as arm rest supporting members 85, 85.

The height, e.g., the hip point, of the rear seat 40 is slightly higher than the height of the front seat 30. The front seat 30 can be rotated vertically to be raised and lowered and also functions as a lid that closes an upper opening of the front housing box 111. The front housing box 111 can house luggage or cargo such as a helmet He.

As shown in FIGS. 6 and 7, the front seat 30 is provided with a seated part for a rider 31, a backrest 32 and right and left side supports 33, 33. As for the seated part for a rider 31, a raised, convex portion 34 for regulating the movement of the seated rider in a direction of the width of the body (the leftward movement L or the rightward movement R) is provided at the center of the front of the seat 30.

The seated rider can be sufficiently supported by the backrest for a rider 32, the side supports for a rider 33, 33 and the convex portion 34. In addition, the leftward or rightward movement of the rider can be restricted by the side supports 33, 33 and the convex portion 34. For example, when the vehicle 10 turns, strong centrifugal force is applied to the rider. In the meantime, as the leftward or rightward movement of the rider can be restricted by the side supports 33, 33 and the convex portion 34, the effect of centrifugal force can be minimized.

The rear seat 40 is a relatively wide seat provided with right and left seated parts for occupants 42, 42 on a seat cushion 41 and is provided with a single backrest for occupants 45 corresponding to the right and left seated parts 42, 42 and right and left arm rests for occupants 48, 48. Two occupants M2, M2 can be seated on the right and left seated parts for occupants 42, 42. As described above, as the wide rear seat 40 provided with the right and left seated parts 42, 42 is provided, the right and left two occupants M2, M2 can be seated on the rear seat 40.

The center of the front of the seat cushion 41 is in the shape of a substantially narrow trapezoid when it is viewed from the top. Specifically, the seat cushion 41 is provided with a flat center 43 between the slightly concave right and left seated parts for occupants 42, 42. The front end 43*a* of the center 43 is close to the rear end of the front seat 30.

The ridge line (contour) of the front end 42*a* of the left seated part 42 is concavely curved rearward in the shape of a circular arc of a radius r1 from the front end 43*a* of the center 43 and extending diagonally rearward on the left side. The ridge line of the front end 42*a* of the right seated part 42 is concavely shaped rearward in the shape of a circular arc of a radius r1 from the front end 43*a* of the center 43 being backed diagonally backward on the right side. As described above, the front ends 42*a*, 42*a* of the right and left seated parts for occupants 42, 42 are concavely shaped rearwards in the shape of the circular arc when it is viewed from the top. As the front end 42*a*, 42*a* of each seated part 42, 42 is shaped concavely rearward, space at the feet of the seated rear occupants M2, M2 can be sufficiently secured. Therefore, the comfort of the rear occupants M2, M2 can be enhanced.

A convex portion 44 for regulating the movement in the direction of the width of the body of the seated right and left rear occupants M2, M2 is also provided at the center 43 (between each seated part 42, 42) of the seat cushion 41.

As shown in FIG. 7, the width W1 of the front end 43*a* of the rear seat 40, e.g., the width W1 of the front end 43*a* at the center 43 is smaller than the width W2 of the front seat 30 (that is, width W2 acquired by adding the width of the seated part 31 and the width of each side support 33, 33). Accordingly, the space at the feet of the seated rear occupants M2, M2 can be sufficiently secured. Therefore, the comfort of the rear occupants M2, M2 can be enhanced.

The backrest for occupants 45 is inclined diagonally forward from the outside in the direction of the width of the body in a traveling direction of the vehicle 10 (in a forward running direction), e.g., in a forward direction Fr. Specifically, a left backrest bevel 46 out of the backrest for occupants 45 is directed diagonally forward in a leftward direction in the traveling direction of the vehicle 10 and a right backrest bevel 46 is directed diagonally forward in a rightward direction in the traveling direction of the vehicle 10.

A straight line Li perpendicular to a center line CL of the width of the body and extended in the direction of the width of the body is shown in FIG. 7. The left backrest bevel 46 is inclined leftward and backward by a tilt angle a based upon the straight line Li. The right backrest bevel 46 is inclined rightward and backward by the tilt angle a based upon the straight line Li. These backrest bevels 46, 46 are shaped slightly concave rearward in the shape of a circular arc.

For right and left two rear occupants M2, M2 to sit on the above-mentioned rear seat 40 in a comfortable posture, they have only to sit with their bodies inclined along the inclination of the backrest 45 and leaning on the backrest. That is, the body of the left rear occupant M2 is directed diagonally forward in the leftward direction in the traveling direction of the vehicle 10 and the body of the right rear occupant M2 is directed diagonally forward in the rightward direction. Even if the wide rear seat 40 is arranged relatively close to the front seat 30 and right and left two rear occupants M2, M2 sit on the rear seat 40, the knees of the rear occupants M2, M2 do not contact the front seat 30.

Therefore, distance between the front seat 30 and the rear seat 40 can be reduced, and an interval between the right and left seated parts 42, 42 does not need to be increased in size. Accordingly, the overall length and width of the vehicle 10 can be reduced and the vehicle can be made relatively smaller. In addition, though a distance between the front seat 30 and the rear seat 40 is made relatively small, the comfort of the right and left two rear occupants M2, M2 can be secured.

Further, in the backrest for occupants 45, a convex portion 47 for regulating the movement in the direction of the width of the body of the seated rear occupants M2, M2 is provided in the center (between the right and left backrest bevels 46, 46). The convex portion 47 includes a vertically extended and relatively narrow part.

As the convex portions 44, 47 for regulating the movement in the direction of the width of the body of the seated rear occupants M2, M2 are provided between each seated part 42, 42 of the rear seat 40 and in the center of the backrest 45, the lateral movement of the two rear occupants M2, M2 can be restricted. For example, when the vehicle 10 is turning, strong centrifugal force is applied to the rear occupants M2, M2. In the meantime, as the lateral movement of the rear occupants M2, M2 can be restricted by the convex portions 44, 47, the effect of the centrifugal force can be minimized.

As clear from the above description, as shown in FIG. 8, the vehicle 10 can operate in a state in which the rider M1 sits on the front seat 30 and the right and left rear occupants M2, M2 sit on the rear seat 40. Each rear occupant M2, M2 has only to sit on the rear seat 40 with his/her body leaning slightly diagonally forward and with both feet extended on the side of the front seat 30 and positioned on a floor 64.

As shown in FIGS. 5 to 7, a pair of right and left arm rest supporting members 85, 85 support a pair of right and left arm rests 48, 48 for the rear seat 40 and support a lower part of the backrest 45 of the rear seat 40 via a hinge 49 so that the backrest can be rotated longitudinally. The arm rests for occupants 48, 48 are supported by the arm rest supporting members 85, 85 provided at the back of the rear seat 40 and the backrest for occupants 45 can be also supported by the arm rest supporting members so that the backrest can be turned longitudinally. The arm rest supporting members 85, 85 that support the arm rests 48, 48 also function as supporting members of the backrest 45. Accordingly, the body frame 11 can be simplified by sharing the supporting members 85, 85 and the vehicle 10 can be reduced in weight.

Further, the arm rest supporting members 85, 85 function as supporting members that support the roof side pillars 81, 81 (see FIG. 3) in addition to supporting the arm rests 48, 48 and the backrest 45. Therefore, the body frame 11 can be further simplified, and the vehicle 10 can be made lighter.

Next, the relation between the backrest 45 of the rear seat 40 and the rear trunk 100 will be described. FIG. 9 is a sectional view of a rear trunk of a vehicle according to an embodiment of the present invention when viewed from a left side. FIG. 10 shows a configuration and action of a backrest of a rear seat and a rear trunk of a vehicle according to an embodiment of the present invention. FIGS. 11(a)–(b) are side views of exemplary arm rest supporting members according to an embodiment of the present invention.

As shown in FIGS. 5 and 9, the rear trunk 100 arranged immediately at the rear of the backrest for occupants 45 is a rear housing box attached to the rear end of the body frame 11, having an upper opening 101 on its upper side, and having a rear opening 102 in the rear and having large open area. The upper opening 101 can be covered with an upper lid 103 and the rear opening 102 can be covered with a rear lid 104. The upper lid 103 is made of a flat plate so that the upper lid also functions as a deck for storing cargo or luggage and is substantially horizontal when the upper lid covers the upper opening 101.

The arm rest supporting members 85, 85 support the front end of the upper lid 103 via a hinge 105 so that the upper lid can be vertically turned. The arm rest supporting members 85, 85 also function as supporting members of the upper lid 103 in addition to supporting the arm rests 48, 48 and the backrest 45. Therefore, the supporting members 85, 85 can be shared, and as a result the body frame 11 can be simplified, and the vehicle 10 can be made lighter. The lower end of the rear lid 104 is attached to the rear lower end of the rear trunk 100 via a hinge 106 so that the rear lid can be vertically turned. The upper lid 103 and the rear lid 104 are configured so that they mutually open in reverse directions as so-called biparting lids.

Therefore, as shown in FIG. 9, the upper opening 101 and the rear opening 102 can be simultaneously opened by opening the upper lid 103 and the rear lid 104 as biparting lids. The upper opening 101 and the rear opening 102 mutually communicate the interior of the trunk 100. As the openings 101, 102 of the rear trunk 100 open relatively wide, luggage can be inserted or extracted by opening both the upper lid 103 and the rear lid 104 relatively easily.

As shown in FIG. 10, the rear face 45a of the backrest for occupants 45 is configured so that the rear face is substantially flat together with the top face 103a of the upper lid 103 in a closed state when the backrest 45 is folded forward. The backrest 45 can be folded forward until it hits on the lower seat cushion 41 to accommodate larger cargo.

The rear face 45a of the backrest 45 when it is folded forward and the top face 103a of the upper lid 103 can be made a continuous large loaded face 107 between the right and left arm rests 48, 48 and between the right and left arm rest supporting members 85, 85. Therefore, large luggage Ba can be easily loaded onto the vehicle 10 on top of the rear seats which are folded to a closed position. In addition, as the arm rests 48, 48 and the arm rest supporting members 85, 85 exist on both right and left sides of the loaded face 107, the luggage Ba loaded onto the loaded face 107 is never displaced sideways.

FIGS. 11A and 11B show examples of the arm rest supporting members according to an embodiment of the present invention. FIG. 11A is a side view showing that various accessories such as a stop lamp 121 and a blinker 122 are provided at the rear end of the arm rest supporting member 85. FIG. 11B is a side view showing that the circumference of the arm rest supporting member 85 is covered with a cover 123 made of resin. Accordingly, the appearance performance of the vehicle can be more enhanced.

In the preferred embodiment of the present invention, the vehicle 10 can be a three-wheeled vehicle or a four-wheel vehicle provided with at least one front wheel 12 and right and left two rear wheels 13, 13.

The vehicle according to the present invention is particularly suitable for small-sized three-wheeled vehicles and four-wheel vehicles in which plural rear occupants can be seated on the rear seat provided at the back of the front seat, however vehicles having fewer or more wheels may also incorporate the unique features of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular seat structure comprising:
    a single front seat for being positioned on a vehicle body, said single front seat including a single seat portion for a front occupant;
    a rear seat provided with right and left seat portions for rear occupants, said rear seat being positioned behind the front seat, said rear seat including a backrest having corresponding sections for the right and left seat portions,
    wherein the backrest is inclined diagonally rearward from a center portion of the rear seat toward side portions of the rear seat and a width of a front end of the rear seat is smaller than an overall width of the front seat.

2. The vehicular seat structure according to claim 1, further comprising raised convex portions provided between the right and left seat portions and in a center portion of the backrest for regulating the movement of seated rear occupants in the direction of the width of the vehicle body.

3. The vehicular seat structure according to claim 2, wherein front ends of the right and left seat portions of the rear seat are concavely shaped.

4. The vehicular seat structure according to claim 1, wherein front ends of the right and left seat portions of the rear seat are concavely shaped.

5. The vehicular seat structure according to claim 1, wherein the front seat further includes:
    a backrest for the front occupant and side supports for the front occupant; and
    a raised convex portion provided at a center portion of a front portion of the single seat portion for regulating the movement of the front occupant in the direction of the width of the vehicle body.

6. The vehicular seat structure according to claim 1, wherein a center portion of the front seat and the center portion of the rear seat are longitudinally aligned along a longitudinal centerline of the vehicle body.

7. A vehicular seat structure comprising:
    a single front seat for being positioned on a vehicle body, said single front seat including:
        a single seat portion for a front occupant;
        a backrest for the front occupant;
        side supports for the front occupant; and a raised convex portion provided at a center portion of a front portion of the single seat portion for regulating the movement of the rider front occupant in the direction of the width of the vehicle body; and a rear seat provided with right and left seat portions for rear occupants, said rear seat being positioned behind the front seat, said rear seat including a backrest having corresponding sections for the right and left seat portions, wherein the backrest is inclined diagonally rearward from a center portion of the rear seat toward side portions of the rear seat.

8. The vehicular seat structure according to claim 7, wherein a width of a front end of the rear seat is smaller than an overall width of the front seat.

9. The vehicular seat structure according to claim 8, wherein a center portion of the front seat and the center portion of the rear seat are for being longitudinally aligned along a longitudinal centerline of the vehicle body.

10. A vehicle for seating a plurality of occupants, said vehicle comprising:
 a vehicle body having at least one front wheel and at least one rear wheel;
 a single front seat positioned on the vehicle body, said single front seat including:
  a single seat portion for a front occupant;
  a backrest for the front occupant and side supports for the front occupant; and
  a raised convex portion provided at a center portion of a front portion of the single seat portion for regulating the movement of the rider in the direction of the width of the vehicle body; and
 a rear seat provided with right and left seat portions for rear occupants is positioned behind the front seat, said rear seat including a backrest having corresponding sections for the right and left seat portions, wherein the backrest is inclined diagonally rearward from a center portion of the rear seat toward side portions of the rear seat.

11. The vehicle according to claim 10, wherein the rear seat has a single backrest having corresponding sections for the right and left seat portions.

12. The vehicle according to claim 10, further comprising raised convex portions provided between the right and left seat portions and in a center portion of the backrest for regulating the movement of seated rear occupants in the direction of the width of the vehicle body.

13. The vehicle according to claim 12, wherein front ends of the right and left seat portions of the rear seat are concavely shaped and a center portion of the front seat and the center portion of the rear seat are longitudinally aligned along a longitudinal centerline of the vehicle body.

14. The vehicle according to claim 10, wherein front ends of the right and left seat portions of the rear seat are concavely shaped.

15. A vehicle for seating a plurality of occupants, said vehicle comprising:
 a vehicle body having at least one front wheel and at least one rear wheel;
 a single front seat positioned on the vehicle body, said single front seat including a single seat portion for a front occupant;
 a rear seat provided with right and left seat portions for rear occupants is positioned behind the front seat, said rear seat including a backrest having corresponding sections for the right and left seat portions, wherein the backrest is inclined diagonally rearward from a center portion of the rear seat toward side portions of the rear seat and a width of a front end of the rear seat is smaller than an overall width of the front seat.

16. The vehicle according to claim 10, wherein a center portion of the front seat and the center portion of the rear seat are longitudinally aligned along a longitudinal centerline of the vehicle body.

17. The vehicle according to claim 10, wherein a width of a front end of the rear seat is smaller than an overall width of the front seat.

18. The vehicle according to claim 10, wherein said at least one rear wheel consists of two wheels.

19. The vehicular seat structure according to claim 1, wherein the rear seat has a single backrest having corresponding sections for the right and left seat portions.

* * * * *